(12) United States Patent
Antoline et al.

(10) Patent No.: US 8,066,110 B2
(45) Date of Patent: Nov. 29, 2011

(54) CONVEYOR SEGMENT AND ASSEMBLY FOR USE IN HIGH WALL MINING, AND COUPLING AND RELEASING METHODS

(75) Inventors: Steven Allen Antoline, Mt. Lookout, WV (US); Paul Emile Van Es, Helvoirt (NL)

(73) Assignee: Superior Highwall Miners, Inc., Beckley, WV (US)

( * ) Notice: Subject to any disclaimer, the term of this patent is extended or adjusted under 35 U.S.C. 154(b) by 631 days.

(21) Appl. No.: 11/814,853

(22) PCT Filed: Feb. 18, 2005

(86) PCT No.: PCT/NL2005/000123
§ 371 (c)(1),
(2), (4) Date: Mar. 18, 2008

(87) PCT Pub. No.: WO2006/088349
PCT Pub. Date: Aug. 24, 2006

(65) Prior Publication Data
US 2008/0277244 A1    Nov. 13, 2008

(51) Int. Cl.
*B65G 41/00* (2006.01)
(52) U.S. Cl. ............. 198/583; 198/584; 299/18; 299/64
(58) Field of Classification Search .................... 299/18, 299/64, 67; 198/583, 584
See application file for complete search history.

(56) References Cited

U.S. PATENT DOCUMENTS

| | | | | |
|---|---|---|---|---|
| 2,221,492 A * | 11/1940 | Sawyer | ........................... | 280/504 |
| 2,426,099 A * | 8/1947 | Hershowitz | .................... | 280/504 |
| 2,872,170 A * | 2/1959 | Alspaugh et al. | ............... | 299/30 |
| 4,387,798 A * | 6/1983 | Jamison et al. | ............... | 198/587 |
| 5,112,111 A * | 5/1992 | Addington et al. | ............. | 299/18 |
| 5,609,397 A * | 3/1997 | Marshall et al. | ................ | 299/67 |
| 5,938,289 A * | 8/1999 | Antoline et al. | ................ | 299/67 |
| 6,042,191 A | 3/2000 | Antoline et al. | | |
| 6,619,687 B2 * | 9/2003 | Goby | ........................... | 280/508 |
| 6,644,753 B2 * | 11/2003 | Mraz | .............................. | 299/1.4 |
| 6,698,843 B2 * | 3/2004 | Mraz | .............................. | 299/18 |
| 6,926,368 B2 * | 8/2005 | Mraz | .............................. | 299/18 |
| 7,011,330 B2 * | 3/2006 | Blanton | ........................ | 280/510 |
| 2004/0245845 A1 | 12/2004 | Lowery | | |

FOREIGN PATENT DOCUMENTS

| | | |
|---|---|---|
| DE | 935 795 | 12/1955 |
| DE | 39 39 999 A1 | 6/1991 |

OTHER PUBLICATIONS

PCT/NL2005/000123; PCT International Search Report mailed Oct. 20, 2005.

* cited by examiner

*Primary Examiner* — Douglas Hess
(74) *Attorney, Agent, or Firm* — Renner, Otto, Boisselle & Sklar, LLP

(57) ABSTRACT

A conveyor segment for use in a train of such conveyor segments in high wall mining is provided with at least one hook located and at least one coupling element, wherein the hook and the coupling element are suited for coupling, wherein the hook is moveable between an open position and a closed position, and the conveyor segment is provided with locking means for securing the hook in a closed position. An assembly includes at least two such conveyor segments. A method of coupling of such conveyor segments includes bringing the hook of a first conveyor segment in contact with a coupling element of second conveyor segment. A method of releasing such conveyor segments includes urging two coupled conveyor segments together while moving the hook from the closed position to the open position.

17 Claims, 4 Drawing Sheets

Figure 1C:
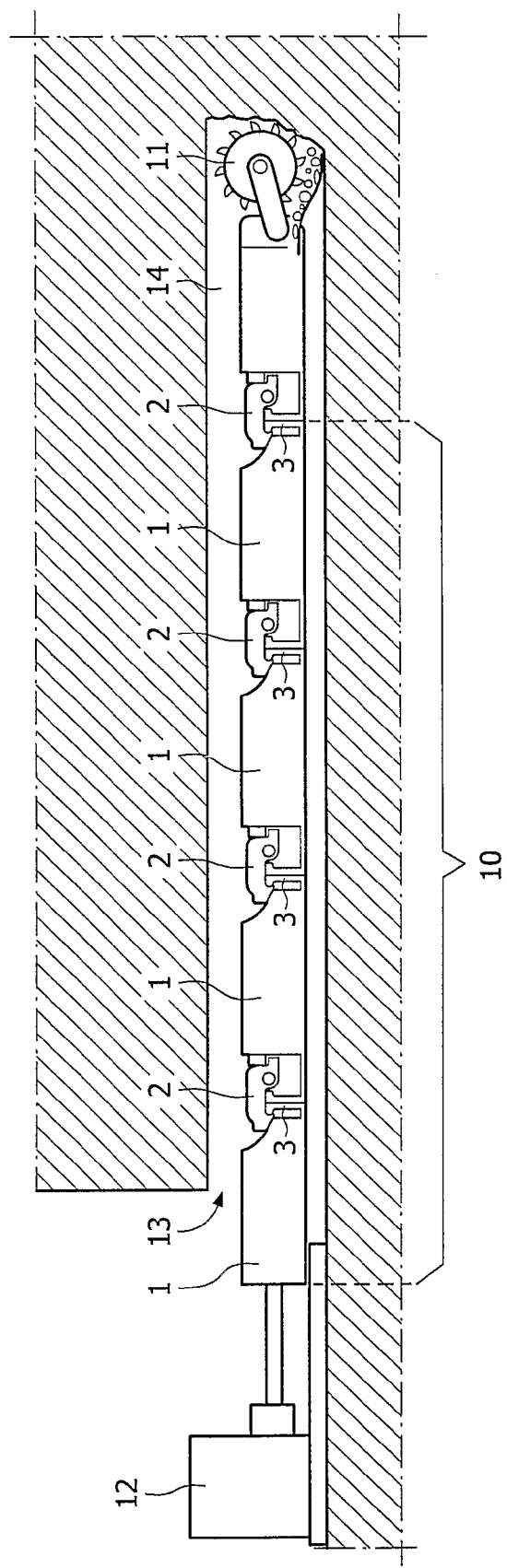

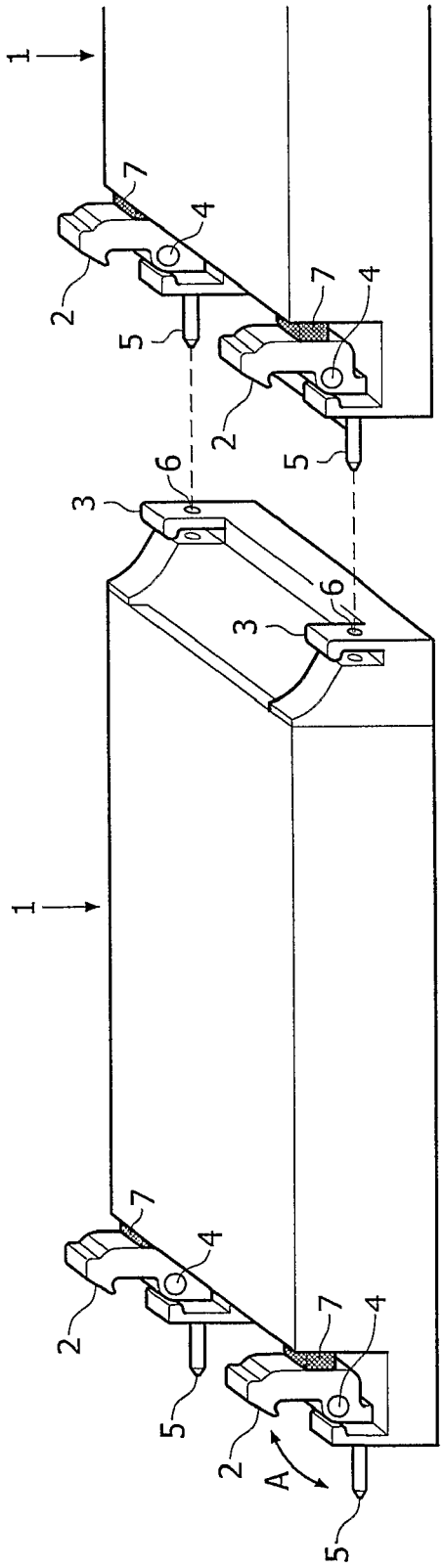
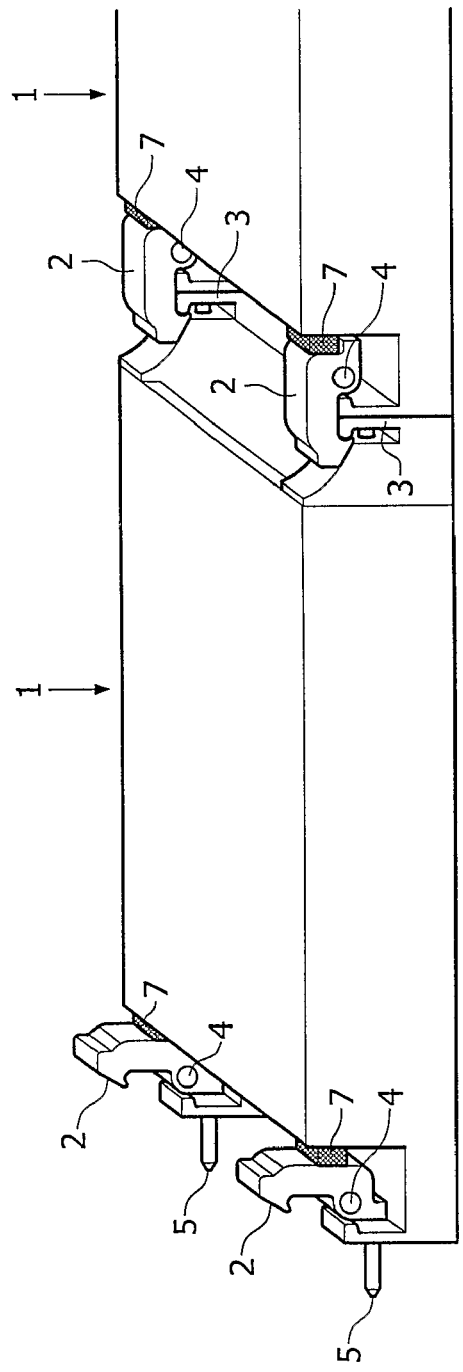
FIG. 1A
FIG. 1B

CONVEYOR SEGMENT AND ASSEMBLY FOR USE IN HIGH WALL MINING, AND COUPLING AND RELEASING METHODS

This application is a national phase of International Application No. PCT/NL2005/000123 filed Feb. 18, 2005 and published in the English language.

The invention relates to a conveyor segment for use in a train of such conveyor segments in high wall mining, provided with at least one hook located at a first end of the conveyor segment, and at least one coupling element located at a second end of the conveyor segment, opposite to the first end, wherein the hook and the coupling element are suited for coupling, wherein the hook is moveable between an open position for releasing a coupling element and a closed position for cooperation with a coupling element, and the conveyor segment is provided with locking means for securing the hook in a closed position. The invention further relates to an assembly of at least two such conveyor segments. Moreover, the invention relates to a method of coupling of such conveyor segments. Finally, the invention relates to a method of releasing such conveyor segments.

High wall mining is applied in the mining of coal, minerals, ores or other materials in seams or veins under an overburden which may be accessed from an exposed edge of the seam or vein. High wall mining is applicable where the appropriate machinery can be placed in a cut or trench to extend a cutter head, followed by a train of conveyor segments or units as the cutter head advances, into a substantially horizontal shaft under the overburden. The conveyor segments are also known as push beams, as they are pushed into the mine, forming an elongating train of conveyor segments as the cutter head advances. Each conveyor segment normally has auger screw transporters or a conveyor belt to move coal from its lead end to its rear end and further onto the next rearward conveyor segment, and ultimately to the launch unit located outside the entrance of the mine shaft.

The train of conveyor segments is elongated by adding conveyor segments. The conveyor segments are coupled by a coupling mechanism, usually a hook that is attached to a coupling element of the next conveyor segment in the line, wherein the coupling element is usually a reinforced ring or bar that suits the dimensions of the hook. The hook is moveable between an open, non-coupling position for receiving a coupling element, and a closed position for connection with a coupling element. In order to secure the coupling between the hook in the closed position and the coupling element, the closed position of the hook is secured by manually applying a wedge that blocks displacement of the hook to the open, non-coupling position. A disadvantage is that the application of the wedge is a time-consuming and hazardous job. Moreover, securing the coupling by a wedge is prone to failure due to the vibrations and tensions occurring in the train of conveyor segments. Also, the uncoupling of the wedge-secured hook and coupling element is often troublesome as the wedges may get stuck. Further, the wedges are sometimes dropped by the workers that have to apply them, with the risk of damaging mining machinery.

It is the aim of the invention to provide a more rapid coupling method of conveyor segments in high wall mining.

The invention provides a conveyor segment for use in a train of such conveyor segments in high wall mining, provided with: at least one hook located at a first end of the conveyor segment, and at least one coupling element located at a second end of the conveyor segment, opposite to the first end, wherein the hook and the coupling element are suited for coupling, wherein the hook is moveable between an open position for releasing a coupling element and a closed position for cooperation with a coupling element, and the conveyor segment is provided with locking means for securing the hook in a closed position, characterized in that the locking means are an integrated part of the conveyor segment. Such a conveyor segment does not suffer the disadvantages associated with the use of loose wedges as described above. Moreover, a conveyor segment according to the invention enables a more rapid and secure coupling of conveyor segments to form a train of conveyor segments in high wall mining. Also, the conveyor segments according to the invention are suitable for automated coupling processes, thus further increasing efficiency and safety. It is advantageous if the conveyor segment comprises more than one hook and correspondingly more than one coupling element, leading to an increased stability of the coupling between two adjacent conveyor segments. Naturally, the positions of hook and the coupling element are chosen to enable a coupling between adjacent conveyor segments in a head-to-tail fashion (e.g. the first end of a first conveyor segment may be coupled to the second end of a second conveyor segment). The coupling element may for instance comprise a ring or bar to which the hook may be attached. The hook may be movable, by translation and/or rotation, in order to provide at least one open position and at least one closed position. The open position is suitable for either releasing or receiving the coupling element, whereas in the closed position a coupling element is attached to the hook such that an actual coupling between adjacent conveyor segments is established. The locking means block the movement of the hook from the closed position to the open position. The hook may comprise for instance a wedge, pin or block, or any other suitable locking element, depending on the nature of the hook. It is preferred if the hook is movable by rotation, as rotation is easily blocked by inserting a locking element into the rotation trajectory of the hook. Moreover, a lever effect may be applied to block rotation of the hook requiring only a relatively simple blocking mechanism. The locking means may be integrated for instance at the first end or the second end of the conveyor segment, or at both ends. If more than one locking means is integrated in the conveyor segment, these locking means are preferably co-operative locking means.

In a preferred embodiment, the locking means comprise at least one resilient element for exerting a bias to the hook at least partially directed to the closed position. Such locking means provide a relatively simple way to secure the coupling between adjacent conveyor segments. Moreover, as the resilient element may actively exert a force, such a locking means offers a more secure lock than known locking means. Thus, the force exerted by the bias has to be overcome if the hook is to be moved from the closed position to the open position. The force of the resilient element may be exerted directly to the hook, or may be conveyed through an essentially non-resilient blocking element. The bias directed at least partially to the closed position of the hook implies that at least a component of the bias is directed to the closed position. The resilient element may be designed to exert either a pushing or a pulling force on the hook, depending on the configuration. The direction of the exerted force may vary with the position of the hook, for instance a pushing force in the closed position and a pulling force in the open position.

It is advantageous if the resilient element comprises a resilient material. Such resilient materials are usually durable as well as easily formed into the preferred form. Also, such materials may be adapted to function as a covering, protecting the hook from mined material that may interfere with its intended functioning. Typical resilient materials comprise synthetic or natural rubber-like polymer materials, for instance polyether and polyurethane materials engineered for the intended purpose. Preferably, durable and wear-resistant resilient materials are used, that retain their shape and bias constant even after repeated deformation. A particular suitable material also known as Sorbothane®, which is a viscoelastic polyether based polyurethane material. This material is particularly suitable, as it combines elasticity with wear-resistance and durability. The wear-resistance may be further improved by providing at least a contact surface of the resilient element with the hook with a wear resistant layer. Such a wear resistant layer may comprise woven materials such as nylon or Kevlar, that may be attached to the surface by glue or moulding with the resilient material.

It is also advantageous if the resilient element comprises at least one spring. The force of a spring may be precisely directed in order to provide the desired bias. Also, springs are reliable and durable. Springs are usually made of metal, but in a preferred embodiment, the springs may be incorporated in a spring-loaded block. In a spring-loaded block, the springs are shielded from potentially harmful mining materials. The spring may also comprise a pneumatic spring element. Such a pneumatic spring element has a high durability. Moreover, the force constant of a pneumatic spring element may be controlled and adjusted by adding or releasing gas pressure, thus providing a higher level of reliability.

In a preferred embodiment, the resilient element is positioned at the first end of the conveyor segment. Thus, the force of the resilient element may be easily conveyed to the hook.

It is advantageous if the resilient element is positioned in contact with the hook. The force exerted by the resilient element may be used most effectively in this configuration.

It is preferred if the resilient element is integrated in the hook. Such a configuration ensures that forces resulting from deformation of the resilient element are effectively exerted on the hook.

In another preferred embodiment, the resilient element is positioned at the second end of the conveyor segment. Thus, the resilient element only exerts a bias on the hook if the hook of another conveyor segment is attached to the coupling element.

It is advantageous if the hook is provided with guiding means for guiding the hook while moving the hook towards the coupling element. Thus it is easier to couple the hook and the coupling element.

Preferably, the guiding means are shaped to urge the hook to an open position. Thus, the coupling element first pushes the hook to the open position after which the coupling element is received by the hook followed by the moving of the hook to the closed position under the bias of the resilient element. Thus, the coupling of the hook and the coupling element is automatically locked.

In a preferred embodiment the conveyor segment is provided with positioning means for positioning the hook with respect to the coupling element of an adjacent conveyor segment. Thus, two conveyor segments are more easily oriented with respect to each other in order to enable a more facile coupling.

Preferably, the positioning means comprise a positioning pin and a pin-hole matching the guiding pin. Such a positioning system is comfortably used. Preferably, either the first end or the second end is provided with a positioning pin, whereas the opposite end is provided with the matching hole, thus making the positioning system directional, providing the direction in which the conveyor segment is to be added to a train of conveyor segments.

Preferably the conveyor segment is provided with an unlocking mechanism operable for movement of the hook from the closed to an open position. Such an unlocking mechanism or unlatching mechanism makes it easier to release a coupled conveyor segment from another conveyor segments. Moreover, the unlocking mechanism may be made suitable for unlatching by an automated system that would lower risk for workers and that would increase the production speed in the high wall mining process.

In a preferred embodiment at least part of the coupling element has a circular cross-section that at least partly matches the hook. In a coupling between such a hook in the closed position and a coupling element, the circular cross-section or surface profile allows for a greater tolerance in the relative vertical orientation of the coupling element and the hook while retaining the same contact area for conveying pulling, pushing and/or torsion forces in a train of conveyor segments. Thus, such a configuration allows for vertical curvatures in a train of such conveyor segments, allowing for more controlled high wall mining by steering the cutter head of the train of conveyor segments in the most preferred curvature, depending on the encountered material. Such a coupling between a hook and coupling element results in a more reliable coupling between conveyor segments. Preferably, both the hook and coupling element comprise a generally circular contact surface, including ellipsoid contact surfaces. The radius of the hook contact surface is preferably fitting the coupling element tightly in order to provide a reliable coupling, but the radius of the hook contact surface may be somewhat wider than the radius of the coupling element. The locking means secure this more reliable coupling.

The invention also provides an assembly of at least two conveyor segments as claimed in any of the foregoing claims, characterized in that at least one hook of a conveyor segment is connected to the coupling element of an adjacent conveyor segment. The assembly is securely coupled, and is relatively easy and rapidly elongated or disassembled. Typically, such an assembly would be a train of conveyor segments used in high wall mining.

The invention also provides a method of coupling of conveyor segments for highwall mining according to the invention, characterised in that by bringing the hook of a first conveyor segment in contact with a coupling element of second conveyor segment the connection of the hook and the coupling element is automatically secured by the locking means. Thus, conveyor segments are relatively easily and rapidly coupled and secured. The time saved compared to coupling of known conveyor segments improves the efficiency of the high wall mining process. The coupling may be performed manually but is also especially suitable for use in an automated coupling system.

The invention also provides a method of releasing conveyor segments for highwall mining according to the invention, characterised in that two coupled conveyor segments are urged together while moving the hook from the closed position to the open position. Thus, conveyor segments may be safely removed from a train of conveyor segments in a controlled manner. Preferably, the decoupling is assisted by external pusher means. More preferably, the decoupling is performed by an automated decoupling system.

The invention will now be explained further in the following examples.

FIGS. 1A-C show a conveyor segment according to the invention.

FIGS. 2 A-C show a hook and coupling element according to the invention.

Figure 3A:
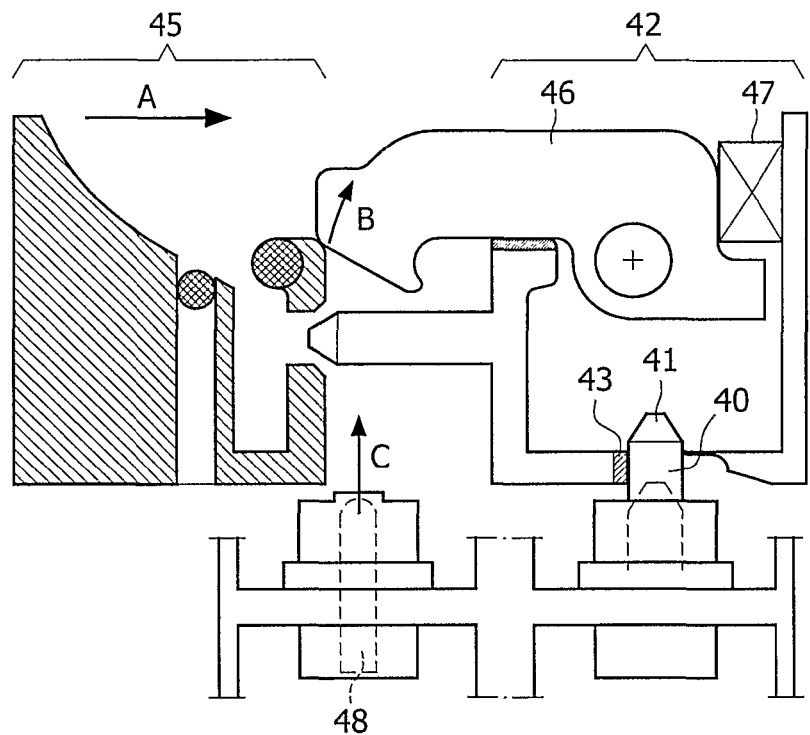
Figure 3B:
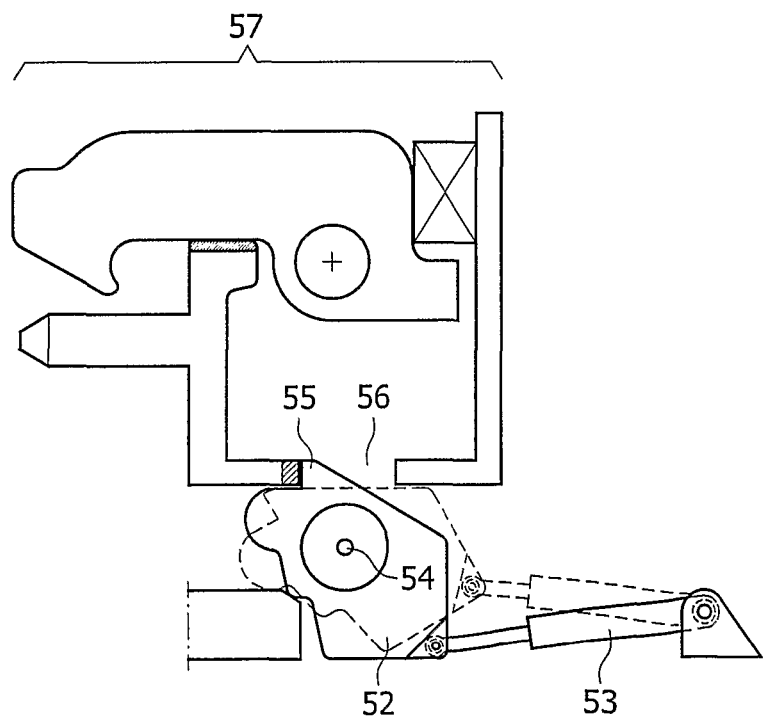

FIGS. 3A and 3B show assisting means for manipulation of the conveyor segments during coupling and decoupling.

FIG. 1A shows a conveyor segment 1 according to the invention, provided with two hooks 2 at one end, and coupling elements 3 matching the hooks 2, located at the opposite end of the conveyor segment 1. The transport system for transporting mined material from one end of the conveyor segment 1 to the opposite end is omitted in the figure for clarity. Each hook 2 is movable by rotation around a shaft 4, independently of the other hook 2. The hooks 2 are shown in an open position, and are movable according to arrow A back and forth between open and closed positions. In the closed position, the hooks may form a connection with a neighbouring conveyor segment 1. The conveyor segment is also provided with two tapered positioning pins 5 matching positioning holes 6 located at the opposite end of the conveyor segment. The system of positioning pins 5 and holes 6 assist in positioning hooks 2 and coupling elements 3 of an adjacent conveyor segment 1 with respect to each other, thus making it easier to connect two conveyor segments. The hooks 2 are provided with a resilient block 7 that exerts a force on the hook 2 towards the closed position, thus acting as an integrated locking system. This system is shown in more detail in FIGS. 2A-2C.

In FIG. 1B, the conveyor segment 1 of FIG. 1A is shown in connection to an adjacent conveyor segment 1, with the hooks 2 of the adjacent conveyor segment 1 the closed position attached to the coupling elements 3. Thus, also the transport systems (not shown) of the conveyor segments 1 are connected. Resilient blocks 7 block the rotation of the hooks 2 around the shaft 4 in the close position, thus locking the coupled configuration of this assembly of conveyor segments.

FIG. 1C shows a train 10 of conveyor segments 1 coupled and locked as depicted in FIG. 1B. A cutter head 11 for cutting ore is attached to the train 10 using coupling means compatible 2, 3 with the hook- and coupling element design of the conveyor segments 1. In the process of high wall mining, conveyor segments 1 are added to the train 10 by a launching platform 12 at the entrance 13 of the mine shaft 14. After a mine shaft 14 is finished, the train 10 is extracted from the mine shaft 14 and the conveyor segments 1 are decoupled to be used again in another mine shaft 14.

Figure 2A:
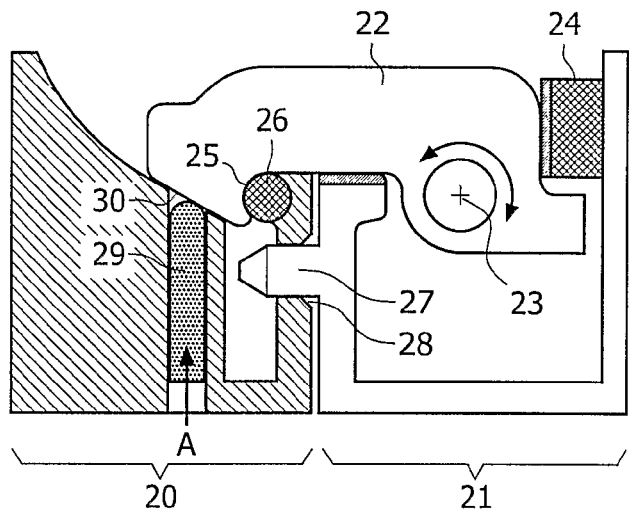

FIGS. 2 A-C shows an assembly of a hook and coupling element according to the invention, to be used for coupling conveyor segments 1 as shown in FIGS. 1A-1C. FIG. 2A shows a coupling element unit 20 and a hook unit 21 in a coupled position. The coupling element unit 20 is part of a first conveyor segment (not shown) that is coupled to a second conveyor segment to which the hook unit 21 belongs. The hook unit 21 comprises a hook 22 provided with a shaft 23 for rotation movement to closed and open positions. A resilient spring-reinforced block 24 is in contact with the hook 22, forcing it in a closed position. The part of the surface of the resilient block 24 in contact with the hook 22 is made of a wear-resistant material, for instance as reinforced coverings such as Kevlar. In the closed position, a round contact surface 25 of the hook 22 attaches to a reinforced bar 26 with a diameter matching that of the contact surface of the hook 22. The hook unit 21 is provided with a positioning pin 27, that fits a positioning hole 28 of the coupling element unit 20, used for positioning the hook 22 and the bar 26 with respect to each other for comfortable and rapid coupling of the conveyor segments. Of course the positions of the pin 27 and the pin-hole 28 are exchangeable: the pin 27 may just as well be placed on the side of the coupling element unit 20, with the corresponding pin-hole 28 on the side of the hook unit 21. The coupling element unit 20 is further provided with an automatic unlatching unit, comprising a displaceable unlatching fork 29 that may be moved upwards (following arrow A) in order to push the hook 22 from the closed position to an open position in which the conveyor segments may be decoupled. The unlatching fork 29 may be displaced by an internal system of the conveyor segment, such as a hydraulic or electric system, or an external power source, by hand or for instance by automated equipment located on the launching platform for high wall mining. As the contact surface 25 bends slightly back towards the shaft of rotation 23, the coupling element unit 20 and the hook unit 21 as depicted in FIG. 2A have to be urged together in order to set the hook 22 free from the bar 26.

Figure 2B:
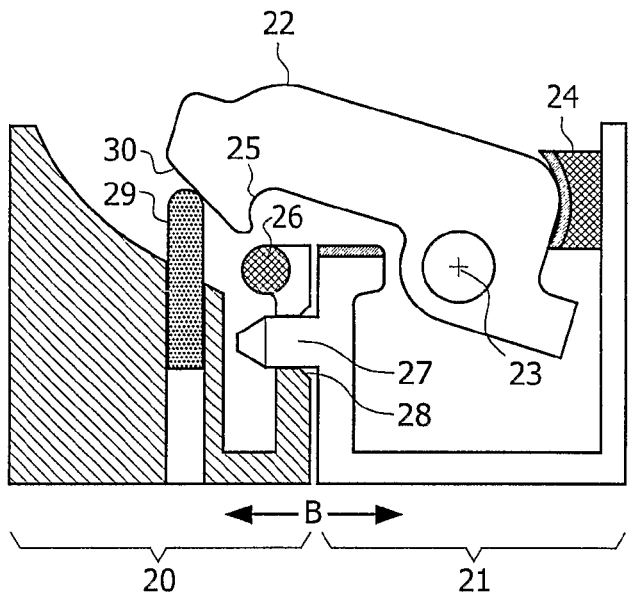

FIG. 2B shows the assembly from FIG. 2A, wherein the hook 22 is in an open position, such that the coupling element unit 20 may be moved apart from the hook unit 21 according to arrows B. In the open position, the hook 22 induces a deformation in the resilient block 24, such that the forces directing the hook 22 towards the closed position (FIG. 2A) are increased. The unlatching fork 29 of the auto-unlatching system is shown in the upwards position, forcing the hook to the open position, thus decoupling the hook 22 and the bar 26. The hook 22 is provided with a guide 30 shaped to urge the hook 22 to the open position.

Figure 2C:
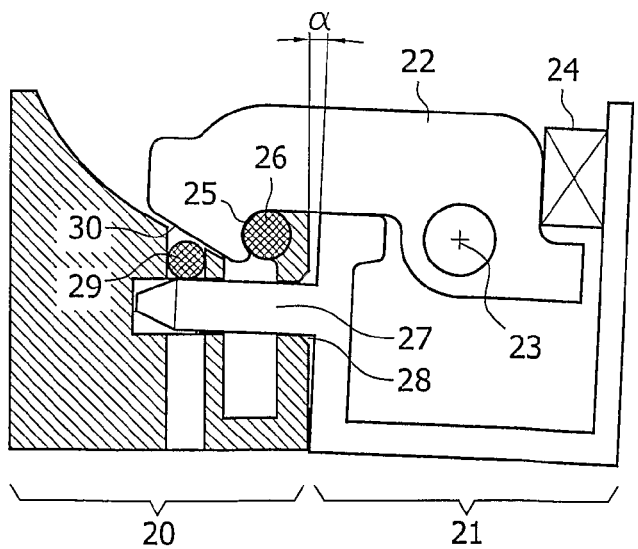

FIG. 2C shows an assembly of a coupling element unit 20 and a hook unit 21 from FIGS. 2A and 2B according to the invention in a coupled position, wherein the adjacent conveyor segments are inclined with respect to each other under an angle α. As round contact surface 25 of the hook 22 is attached to the reinforced bar 26 with a diameter matching that of the contact surface of the hook 22, various rotational angles α are tolerated. The security of the coupling is improved by the shapes of the positioning pin 27 and the positioning hole 28, that restrict the angle α. In this figure, a slightly downward inclination of the adjacent conveyor segments is depicted, however also a slightly upwards inclination is possible. Preferably, the coupling units 20, 21 are designed to allow a maximal angle α between the interfaces of adjacent conveyor segments of approximately 3° downwards or upwards. Such a limitation allows for sufficient flexibility in a train of conveyor segments (see FIG. 1C) to allow the cutter head of the train to pursue the preferred route when cutting a mine shaft. However, the amount of freedom per conveyor segment remains small enough to provide for the desired reliability and control over the movement of the conveyor segments. The flexibility allows the cutter head to be led through preferred layers in the earth. A train of conveyor segments that follows the cutter head may deviate 3° from a straight line configuration per conveyor segment. Usually, the vertical curvatures in the train of conveyor segments will vary, containing upwards and downward oriented curves throughout the train.

FIG. 3A shows assisting means for manipulation of the conveyor segments, in order to facilitate easier coupling and decoupling of conveyor segments in a train of conveyor segments in high wall mining. Said assisting means may be incorporated in the launch platform for high wall mining, or may be separate units. The function of the assisting means may comprise the temporary holding of the conveyor segments and positioning of conveyor segments to accomplish coupling or decoupling. The assisting means comprise a blocking element 40 with a tapered end, here shown in a locking position. The blocking element 40 interacts with the sides of a suitably matching aperture of the hook unit 42, fixing the horizontal position by interaction with an aperture of the hook unit 42. The blocking element is provided with electric of hydraulic displacement means, for displacing of the blocking element 40 to a non-blocking position (shown in dotted lines 44). The non-blocking position 44 allows horizontal movement of the hook unit 42. While the horizontal position of the hook element 42 is fixed by the blocking element, another conveyor segment 45 may be coupled with the hook element by moving the coupling element 45 of that conveyor segment towards the hook 46 according to arrow A, thus forcing the hook to an opened position according to arrow B, against the bias exerted by the spring-reinforced block 47. After coupling, the coupled conveyor segments may be released by pulling back the blocking element 40. For decoupling purposes, the assisting means also comprise an unlatching element 48 that is vertically displaceable according to arrow C, that is adopted to push the hook 46 to an open position to release the coupled hook. The blocking element may be automated in order to provide for rapid and controlled coupling and decoupling processes. Obviously, the hook unit 42 and coupling unit 45 may be interchanged.

FIG. 3B shows an alternative blocking element 52 that may replace the blocking element 42 from FIG. 3A. The blocking element 52 is shown in a blocking position, and may be rotated by driving means 53 to a non-blocking position shown in dotted lines. A rotating blocking element mounted on a relatively thick shaft 54 has the advantage of an improved reliability and durability. In the non-blocking position (dotted lines), the interacting organ 55 of the blocking element 52 is rotated out of an aperture 56 of the hook unit, enabling free horizontal movement of the conveyor segment to which the hook unit 57 belongs.

Obviously, the scope of the invention is wider than the examples shown here, and includes various other embodiments and variations.

The invention claimed is:

1. Conveyor segment for use in a train of such conveyor segments in high wall mining, provided with:
   at least one hook located at a first end of the conveyor segment, and
   at least one coupling element located at a second end of the conveyor segment, opposite to the first end,
   wherein the hook and the coupling element are suited for coupling,
   wherein the hook is moveable by rotation between an open position for releasing a coupling element and a closed position for cooperation with a coupling element, and
   the conveyor segment is provided with a resilient locking device for securing the hook in the closed position, wherein
   the resilient locking device comprises a body made of natural or synthetic rubber material that is an integrated part of the conveyor segment.

2. Conveyor segment as claimed in claim 1, wherein the resilient locking device exerts a bias to the hook at least partially directed to the closed position.

3. Conveyor segment as claimed in claim 2, wherein the resilient locking device is positioned at the first end of the conveyor segment.

4. Conveyor segment as claimed in claim 2, wherein the resilient locking device is positioned in contact with the hook.

5. Conveyor segment as claimed in claim 4, wherein the resilient locking device is integrated in the hook.

6. Conveyor segment (1) as claimed in claim 2, wherein the resilient locking device is positioned at the second end of the conveyor segment.

7. Conveyor segment as claimed in claim 1, wherein the resilient locking device further comprises at least one spring incorporated into the body of the locking device.

8. Conveyor segment as claimed in claim 1, wherein the hook is provided with guiding means for guiding the hook while moving the hook towards the coupling element.

9. Conveyor segment as claimed in claim 8, wherein the guiding means are shaped to urge the hook to an open position.

10. Conveyor segment as claimed in claim 9, wherein the positioning means comprise a positioning pin and a pin-hole matching the guiding pin.

11. Conveyor segment as claimed in claim 1, wherein the conveyor segment is provided with positioning means for positioning the hook with respect to the coupling element of an adjacent conveyor segment.

12. Conveyor segment as claimed in claim 1, wherein the conveyor segment is provided with an unlocking mechanism operable for movement of the hook from the closed to an open position.

13. Conveyor segment as claimed in claim 1, wherein at least part of the coupling element has a circular cross-section that at least partly matches the hook.

14. Assembly of at least two conveyor segments as claimed in claim 1, wherein at least one hook of a conveyor segment is connected to the coupling element of an adjacent conveyor segment.

15. Method of coupling of conveyor segments for highwall mining as claimed in claim 1, wherein by bringing the hook of a first conveyor segment in contact with a coupling element of second conveyor segment the connection of the hook and the coupling element is automatically secured by the locking device.

16. Method of releasing conveyor segments for highwall mining as claimed in claim 1, wherein two coupled conveyor segments are urged together while moving the hook from the closed position to the open position.

17. Conveyor segment as claimed in claim 1, wherein the resilient locking device is configured to block rotation of the hook from the closed position to the open position.

* * * * *